United States Patent [19]

Barthold

[11] Patent Number: 4,734,839

[45] Date of Patent: Mar. 29, 1988

[54] SOURCE VOLT-AMPERE/LOAD VOLT-AMPERE DIFFERENTIAL CONVERTER

[76] Inventor: Fred O. Barthold, 1873 Wilstone Ave., Leucadia, Calif. 92024

[21] Appl. No.: 28,900

[22] Filed: Mar. 23, 1987

[51] Int. Cl.$^4$ ............................................. H02M 3/335
[52] U.S. Cl. ........................................ 363/16; 363/21
[58] Field of Search ................... 363/16, 20, 21, 97, 363/124; 323/268, 271, 272, 224, 222

[56] References Cited

U.S. PATENT DOCUMENTS

| | | | |
|---|---|---|---|
| 3,935,526 | 1/1976 | Kamata et al. | 363/21 |
| 4,184,197 | 1/1980 | Ćuk et al. | 363/16 |
| 4,455,596 | 6/1984 | Baker | 363/21 |
| 4,481,565 | 11/1984 | Colton | 363/21 X |
| 4,513,361 | 4/1985 | Rensink | 363/21 |
| 4,641,229 | 2/1987 | Easter | 363/21 |
| 4,665,473 | 5/1987 | Onda et al. | 363/21 |

OTHER PUBLICATIONS

P. Wood, "General Theory of Switching Power Converters", PESC '79 Record, San Diego, Calif., Jun. 18–22, 1979, pp. 1–5.
E. E. Landsman, "A Unifying Derivation of Switching DC—DC Converter Topologies", PESC '79 Record, San Diego, Calif., Jun. 18–22, 1979, pp. 239–243.
G. E. Bloom et al., "Modeling, Analysis, and Design of a Multi-Output Ćuk Converter", POWERCON 7, San Diego, Calif., Mar. 24–27, 1980, pp. I1-1–I1-14.
L. Rensink et al., "Design of a Kilowatt Off-Line Switcher Using a Ćuk Converter", POWERCON 6, Fla., May 2–4, 1979, pp. H3-1 to H3-2.
A. Cocconi et al., "Design of a 2 KW, 100 KHz Switching Regulator for Space Shuttle", Powerconversion International, Jan. 1983, pp. 11–21.

*Primary Examiner*—Peter S. Wong
*Attorney, Agent, or Firm*—Frank D. Gilliam

[57] ABSTRACT

A source V-A/load V-A differential converter (single quaddrant DC-DC topology) combines the canonical functions of both the boost and buck converter topologies. Basic advantages of the boost and buck topologies are retained, disadvantages of these and prior art compound topologies are eliminated, and several entirely new and useful functions are realized. These new functions include sub-microsecond source voltage/load step response (independent of feedback loop parameters), extremely wide source voltage range, very high conversion efficiency/power density, multiple auxiliary outputs with closely held voltage range parameters (without resort to minimum load, pre-load, or sub-regulation), galvanic input/output isolation, enhanced capacitance safety/energy storage, reduced gain bandwidth requirements, and intrinsic stability. The differential term derives from the transfer function for this new compound topology, i.e., $x = \delta(a + x)$.

32 Claims, 8 Drawing Figures

SOURCE VOLT-AMPERE/LOAD VOLT-AMPERE DIFFERENTIAL CONVERTER

BACKGROUND OF THE INVENTION

1. Field of the Invention

The invention relates to power converters, (source V-A/load V-A) of the DC-DC switchmode converter family. In particular, the invention relates to DC-DC switchmode converters of the compound type. More particularly, the invention relates to the differential combination of the boost (current sourced) topology and the reciprocal buck (voltage sourced) topology, to effect the new compound single quadrant DC-DC switchmode converter.

2. Description of the Prior Art

E. E. Landsman states that . . . "all three classical switching converter circuits" (FIGS. 1, 2, 3) "can be derived from a single canonical switching cell.", see E. E. Landsman, "A Unifying Derivation of Switching DC-DC Converter Topologies," *PESC '79 Record* (*IEEE Power Electronics Specialists Conference*—1979. (Publication #79CH1461-3 AES), June 18-22, 1979, p 243.

Peter Wood states that . . . "when we arrive at the single quadrant DC-DC converters, we find that the voltage sourced is the 'buck' converter" (FIG. 2)"and the current sourced the 'boost' " (FIG. 1)", reciprocals in every respect including transfer characteristics . . . the usual 'buck-boost'" (FIG. 3)"is nothing more or less than a cascaded connection of boost and buck converters, . . .", see Peter Wood, "General Theory of Switching Power Converters", *PESC '79 Record* (*IEEE Power Electronics Specialists Conference*—1979, (Publication #79CH1461-3 AES), June 18-22, 1979, p 5.

Slobodan M. Cuk, et al, state that ". . . it has been found that the buck" (FIG. 2)", boost" (FIG. 1)"and buck-boost converters, previously considered to be a closed triad of simple power stages, are actually only three members of a four converter family. Completing the set is . . . the Cuk converter.", see Loman Rensink, Art Brown, Shi-ping Hsu, and Slobodan Cuk, "Design of a Kilowatt Off-Line Switcher Using a Cuk Converter," *Proceedings of the Sixth National Solid-State Power Conversion Conference*, May 2-4, 1979, p H3-2.

Robert D. Middlebrook and Slobodan M. Cuk state that ". . . general dc conversion . . . can be achieved by simply cascading the two basic converters, namely the boost" (FIG. 1) ". . . and the buck" (FIG. 2)". . . resulting in the same overall dc gain. . . While this converter" (FIG. 3)" has some good properties (both input and output currents continuous, that is, non-pulsating) it has some additional deficiencies. It needs an additional transistor Q2 and diode D2 which cause added dc and switching losses and hence significantly degrade the efficiency of the converter, besides its increase of complexity and number of components. Also at least one of the switching transistors requires floating drive circuitry, hence need for two isolated drive circuits, which further complicates its drive. Also there is no possibility to introduce the isolation property into this converter by simple means . . .", see Robert D. Middlebrook and Slobodan Cuk, U.S. Pat. No. 4,184,197, 1/1980, excerpted 3-63 through 4-18.

Since these prior art topologies have been so exhaustively analyzed, only the salient features (or lack thereof) will be discussed.

The boost converter (FIG. 1) displays continuous input current (current sourced), discontinuous output current, and the transfer function, E in/$(1-\delta)$=E out.

The isolated boost converter (flyback) (FIG. 4) loses the continuous input current property, as the inductor L1 (FIG. 1) is incorporated into the flyback transformer T1 (FIG. 4).

The buck converter (FIG. 2) displays discontinuous input current (voltage sourced) continuous output current, and the transfer function E in($\delta$)=E out.

The isolated buck converter (forward) (FIG. 5) requires an additional transformer T2 and diode D3.

The cascade boost-buck converter (FIG. 3) displays continuous input current, continuous output current, and the transfer function E out=$\delta$(E in+E out), thus realizing the general DC-DC conversion function. The boost-buck transfer function may be clarified by setting E in (FIG. 1)=a, E out (FIG. 1)=E in (FIG. 2)=b, E out (FIG. 2)=x, t on/T=$\delta$. Substituting and transposing $[a/(1-\delta)=b]$(boost), $[b(\delta)=x]$ (buck), then $[x=\delta(a+x)]$ (boost-buck). Given $0<\delta<1$, and $0<a<\infty$ then x may be derived from differential control of $\delta$.

The isolated Cuk converter (FIG. 6) realizes the general DC-DC conversion function, in compound topology. However, this series capacitance fed, coupled inductor topology exhibits several undesirable properties. These negative properties include (1) output voltage reversal at turn-on; G. E. Bloom, A. Eris, and R. Ruble state that "one undesirable feature of operation . . . , namely that of transient voltage polarity reversal . . . must be circumvented or reduced to acceptable magnitudes."; see G. E. Bloom, A. Eris, and R. Ruble, "Modeling, Analysis, and Design of a Multi-Output Cuk Converter," *Proceedings of Powercon 7*, Mar. 24-27, 1980, p 11-14.

(2) requirement for power component damping; Alan Cocconi and Slobodan Cuk state that ". . . one must find the method which will introduce the required damping . . . to damp otherwise unacceptable high resonant peaks of the pole pairs."; see Alan Cocconi and Slobodan Cuk, "Design of a 2 KW, 100 KHZ Switching Regulator for Space Shuttle", *Powerconversion International*, January 1983, p 14-15.

(3) right half plane zero; Alan Coccini and Slobodan Cuk state that ". . . frequency response contains a very nasty right half plane zero . . . immune to all attempts of passively damping . . . "; see pages 20-21 of the last-mentioned reference.

(4) topological inefficiency; this series capacitor fed configuration requires that both primary and secondary of T1 conduct continuously, i.e., during both the energy storage cycle (Q1 off), and the energy delivery cycle (Q1 on). At $\delta$=0.5 duty cycle, this involvement doubles the resistive losses, according to the formula i rms=$\sqrt{0.5i^2+0.5i^2}$. The second $0.5i^2$ term disappears from the conventional forward transformer loss equation. Additionally, the unterminated reactance (leakage inductance) of T1 contributes doubly to the damping losses of (2);

(5) additional safety burden; the "floating" (ungrounded) case installation of C1 and C2 (FIG. 6) imposes insulation/safety considerations not found in parallel (grounded) capacitor topologies;

(6) complex loop compensation requirements; Alan Cocconi and Slobodan Cuk state that "all attempts to close the feedback loop by conventional means, . . . are either futile, or result in . . . unusable transient responses, far away from required specifications", see pages 20–21 of the last-mentioned reference.

The cascade boost-buck topology (FIG. 3) is seen to realize the idealized general DC-DC conversion function. If the seemingly intractable deficiencies previously cited could be overcome (inefficiency, complexity, impossibility of simple isolation, etc.), the cascade boost-buck topology (FIG. 3) would be the preferred topology in single-quadrant DC-DC conversion.

The foregoing suggests that an ideal source V-A/load V-A converter should incorporate at least the following set of objectives:

it should realize the idealized general DC-DC conversion function;

it should provide for intrinsic circuit response to source/load demands, extraordinary to feedback loop parameters;

it should be intrinsically stable without resort to power dissipating damping;

it should exhibit theoretically infinite source/load voltage range;

it should require only first-order feedback loop compensation and minimum gain bandwidth;

it should deploy both input voltage and load current feed-forward by topologically inherent function, in current mode loop control;

it should function in both the continuous and discontinuous states of internal current flow;

it should obtain multiple, isolated, and stable output voltages without resort to minimum loads, pre-loads, sub-regulation, or other circuit manipulation.

it should achieve galvanic isolation between output voltages, as well as between input and output voltages;

it should eliminate output inductor saturation as induced by volt-second unbalance during overload and short circuit;

it should demonstrate continuous, non-pulsating, input and output currents;

it should suffer no power losses, safety constraints, or polarity anomalies in consequence of the topologically inherent deficiencies characteristic of prior art;

it should be capable of realization with readily available materials and components, requiring no "exotic" or yet-to-be-perfected apparatus;

it should exceed the composite power/performance density of all prior circuit art in the field of the invention.

it should introduce an entirely new topology to the converter family, a fifth and penultimate member of the set.

SUMMARY OF INVENTION

The invention provides new means of realizing the idealized general DC-DC conversion function. The invention consists of two switches (may be combined) two power transformers (may be combined), four or six rectifiers, two capacitors (one may be divided), one inductor, and a control means, combined into the new compound boost-buck topology.

Responsive to the control means, the switch(es) connect the source voltage and the source voltage/boost product voltage to the transformer(s). The resultant currents are so circuit distributed as to produce the compound boost-buck energy transfer (via the rectifiers, capacitors, and inductor) from the source to the utilization load. Reference to the I in and I out waveforms of FIGS. 1 through 5 and FIGS. 7 and 8 illustrate the generic canonical compound current structure.

Therefore, the invention will accomplish the following objectives:

realize the idealized general DC-DC conversion function;

provide for circuit response to load demands, extraordinary to feedback loop parameters;

be intrinsically stable without resort to power dissipating damping;

exhibit theoretically infinite source/load voltage range;

require only first-order feedback loop compensation and minimum gain bandwidth;

deploy both input voltage and load current feed-forward by topologically inherent function, in current mode loop control;

function in both the continuous and discontinuous states of internal current flow;

obtain multiple, isolated, and stable output voltages without resort to minimum loads, pre-loads, sub-regulation, or other circuit manipulation.

achieve galvanic isolation between output voltages, as well as between input and output voltages;

eliminate output inductor saturation as induced by volt-second unbalance during overload and short circuit;

demonstrate continuous, non-pulsating, input and output currents;

suffer no power losses, safety constraints, or polarity anomalies in consequence of the topologically inherent deficiencies characteristic of prior art;

be capable of realization with readily available materials and components, requiring no "exotic" or yet-to-be-perfected apparatus;

exceed the composite power/performance density of all prior circuit art in the field of the invention;

introduce an entirely new topology to the converter family, a fifth and penultimate member of the set.

DESCRIPTION OF INVENTION

For the purpose of explanation of the invention, assume t on/T=$\delta$ and t on=t off, then E boost=2E in, according to the formula E in/1−δ=E boost; assume a 1:1 turns ratio for power transformers 12 and 13, and assume ideal switches and unidirectional conducting devices.

Figure 1:
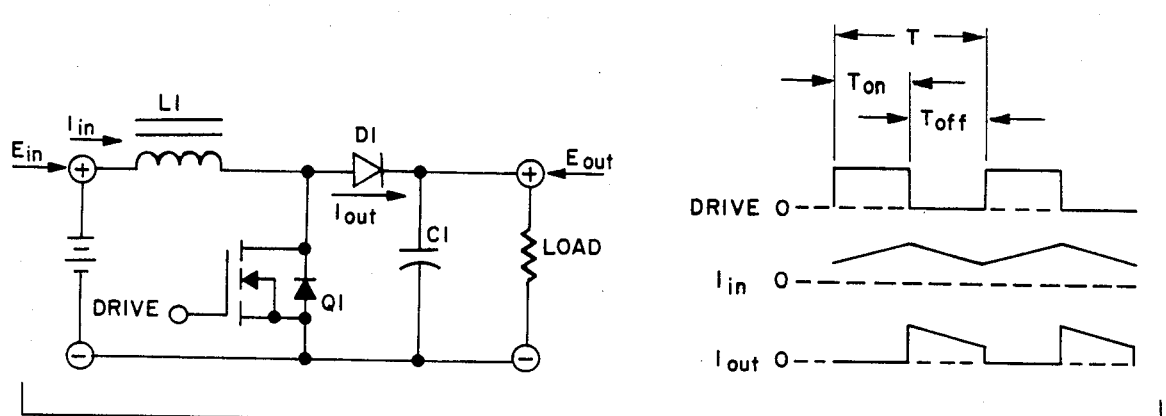
FIG. 1 illustrates the canonical form of the single quadrant DC-DC boost converter circuit (non-isolated) and attendant wave forms.
Figure 2:
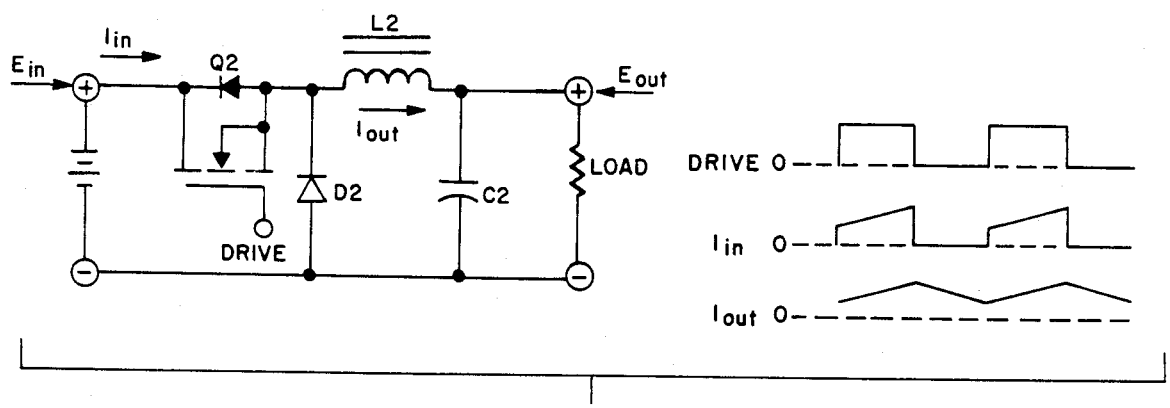
FIG. 2 illustrates the canonical form of the single quadrant DC-DC buck converter circuit (non-isolated) and attendant waveforms.
Figure 3:
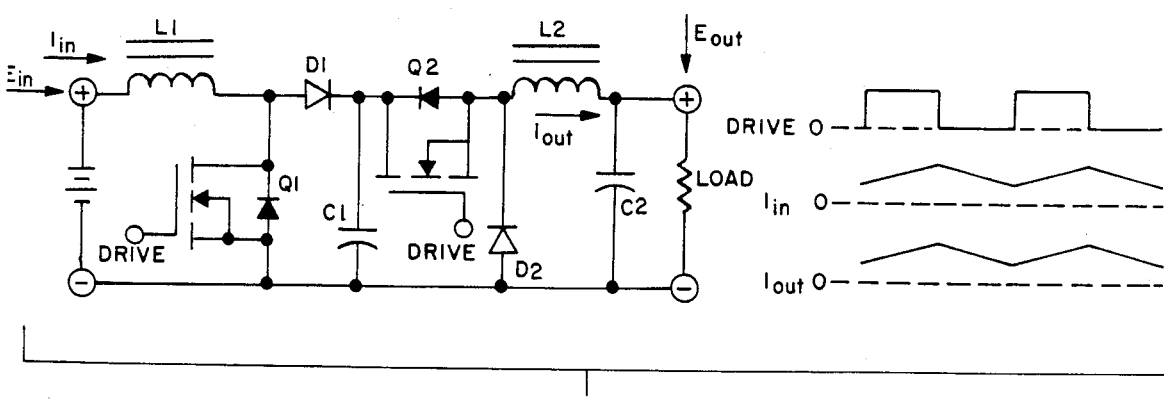
FIG. 3 illustrates the canonical form of the single quadrant DC-DC cascade boost-buck converter circuit (non isolated) and attendant waveforms.
Figure 4:
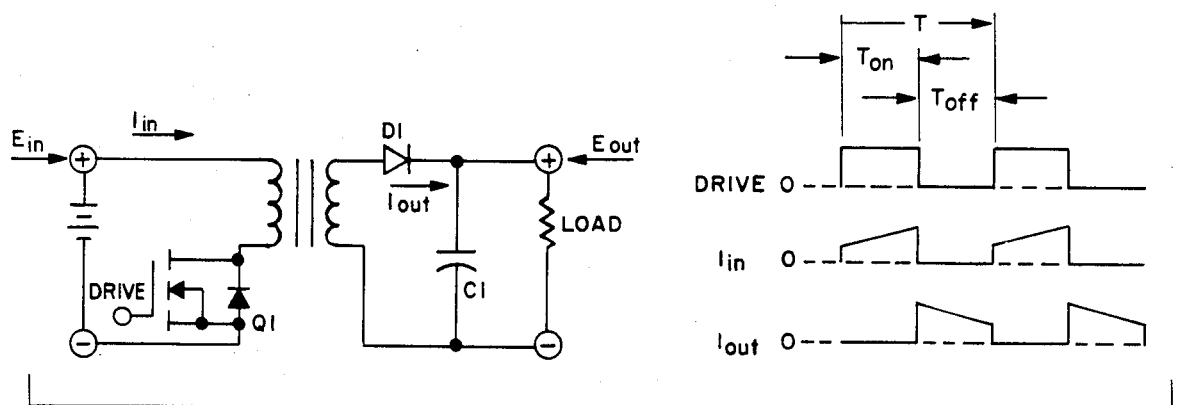
FIG. 4 illustrates the derivative form of the single quadrant DC-DC boost converter circuit (isolated, flyback) and attendant waveforms.
Figure 5:
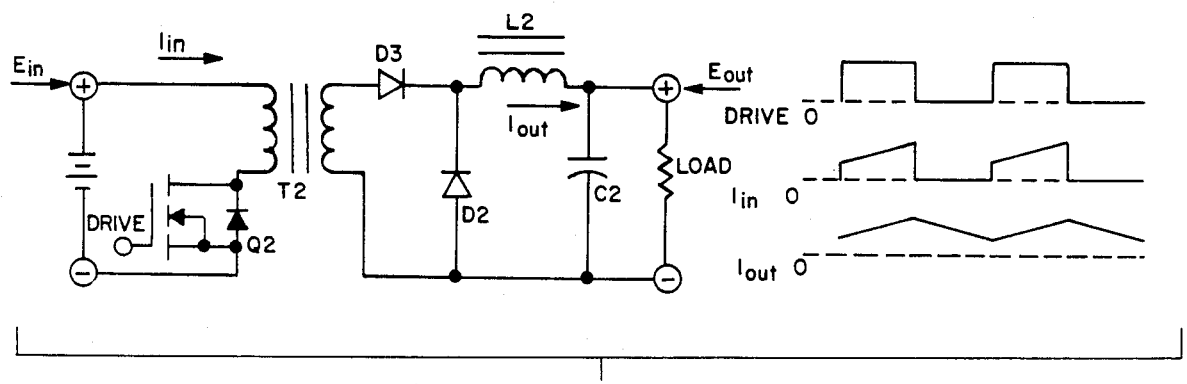
FIG. 5 illustrates the derivative form of the single quadrant DC-DC buck converter circuit (isolated, forward) and attendant waveforms.
Figure 6:
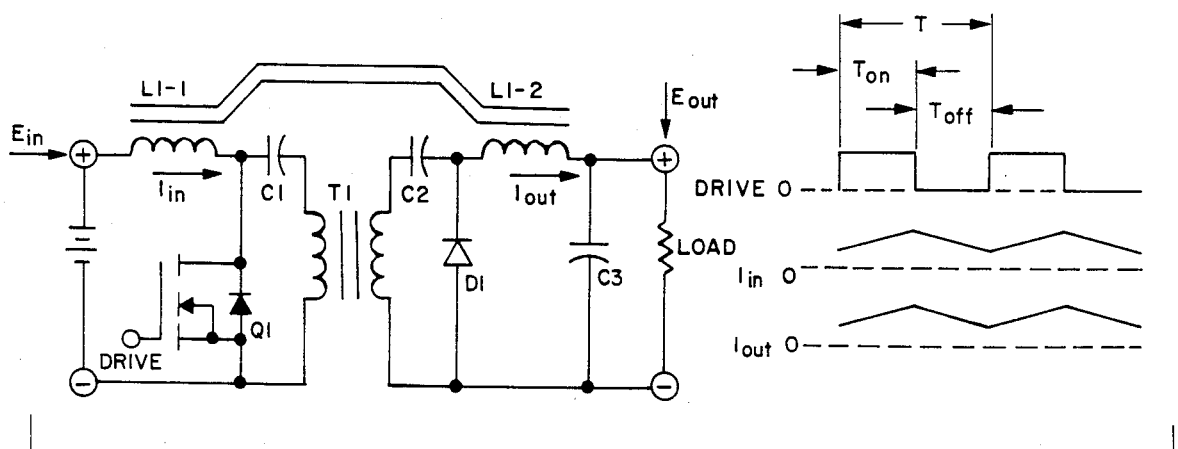
FIG. 6 illustrates the basic coupled inductor, series capacitor fed Cuk converter circuit (isolated) and attendant waveforms.
Figure 7:
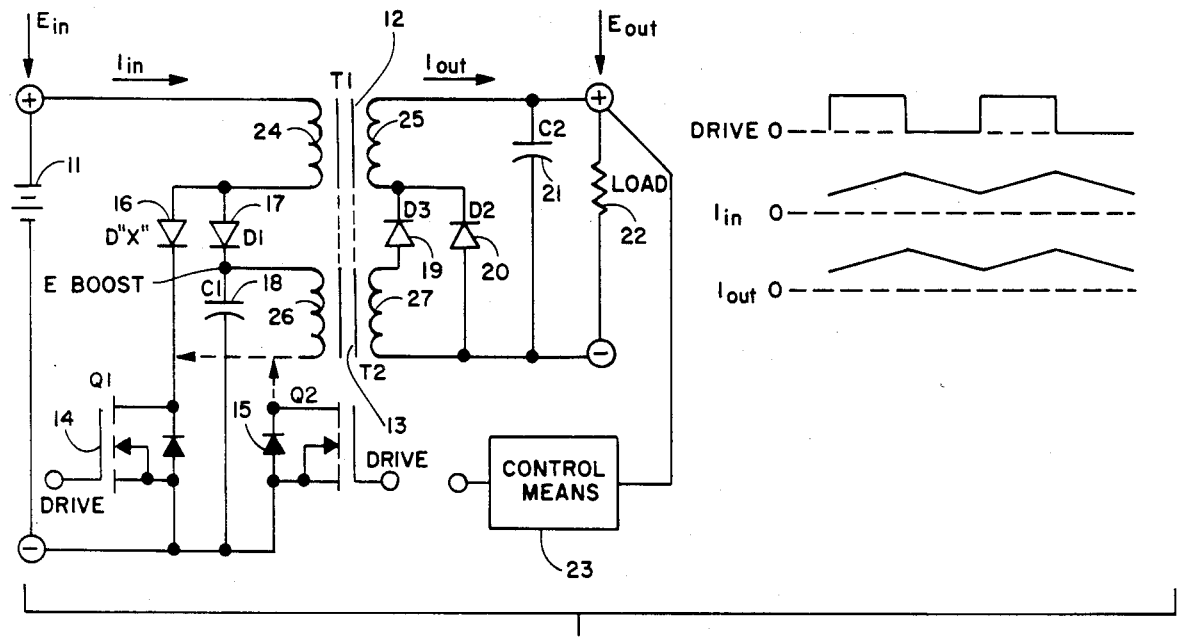
FIG. 7 illustrates a derivative preferred source volt-ampere/load volt-ampere differential converter in single quadrant DC-DC circuit embodiment (isolated) and attendant waveforms.

1. On state operation of switch(es) 14 and 15:

Referring now to FIG. 7, switch 14 and switch 15 are selectively and simultaneously closed by control means 23 so as to connect the primary 24 of power transformer 12 across the DC voltage source 11 (via unidirectional conducting device 16) and the primary 26 of power transformer 13 to the boost voltage product E boost. E out will derive (via unidirectional conducting device 19) from E boost (as applied to primary 26 and transformed to secondary 27) minus E in (as applied to primary 24 and transformed to secondary 25) and will therefore equal E in. The differential transfer function x=δ(a+x) is thus confirmed, i.e., E out=δ(E in+E out), during the on state of switch(es) 14 and 15, for the intervals 0<δ<1 and 0<a<∞.

2. Off state operation of switch(es) 14 and 15:

Referring again to FIG. 7, switch 14 and switch 15 are selectively and simultaneously opened by control means 23 so as to disconnect the primaries 24 and 26 of power transformers 12 and 13. Primary 24 is now connected between E in E boost (via unidirectional conducting device 17) according to conventional flyback performance. Primary 26 is non-functional in this state. E out will derive (via unidirectional conducting device 20) from E boost minus E in (as applied to primary 24 and transformed to secondary 25) and will therefore equal E in. The differential transfer function x=δ(a+x) is thus confirmed, i.e., E out=δ(E in+E out) during the off state of switch(es) 14 and 15, for the intervals 0<δ<1 and 0<a<∞.

3. On state utilization load 22 intrinsic stability and non-loop derived energy transfer:

Referring again to FIG. 7, any delta in E out will result in an instantaneous current transfer between windings of power transformer 12. Since E out is the sum of E boost −E in (as transformed), any increase in E out (as a consequence of a reduction of utilization load 22) will reverse bias unidirectional conducting device 19, thus transferring secondary 25 current to primary 24 until voltage equilibrium is attained. Likewise, any decrease in E out (as a consequence of an increase of utilization load 22) will reverse bias unidirectional conducting device 16, thus transferring primary 24 current to secondary 25 until voltage equilibrium is attained.

4. Off state utilization load 22 intrinsic stability and non-loop derived energy transfer:

Referring again to FIG. 7, any delta in E out will result in an instantaneous current transfer between windings of power transformer 12. Since E out is the sum of E boost−E in (as transformed), any increase in E out (as a consequence of a reduction of utilization load 22) will reverse bias unidirectional conducting device 20, thus transferring secondary 25 current to primary 24 until voltage equilibrium is attained. Likewise, any decrease in E out (as a consequence of an increase of utilization load 22) will reverse bias unidirectional conducting device 17, thus transferring primary 24 current to secondary 25 until voltage equilibrium is attained.

Figure 8:
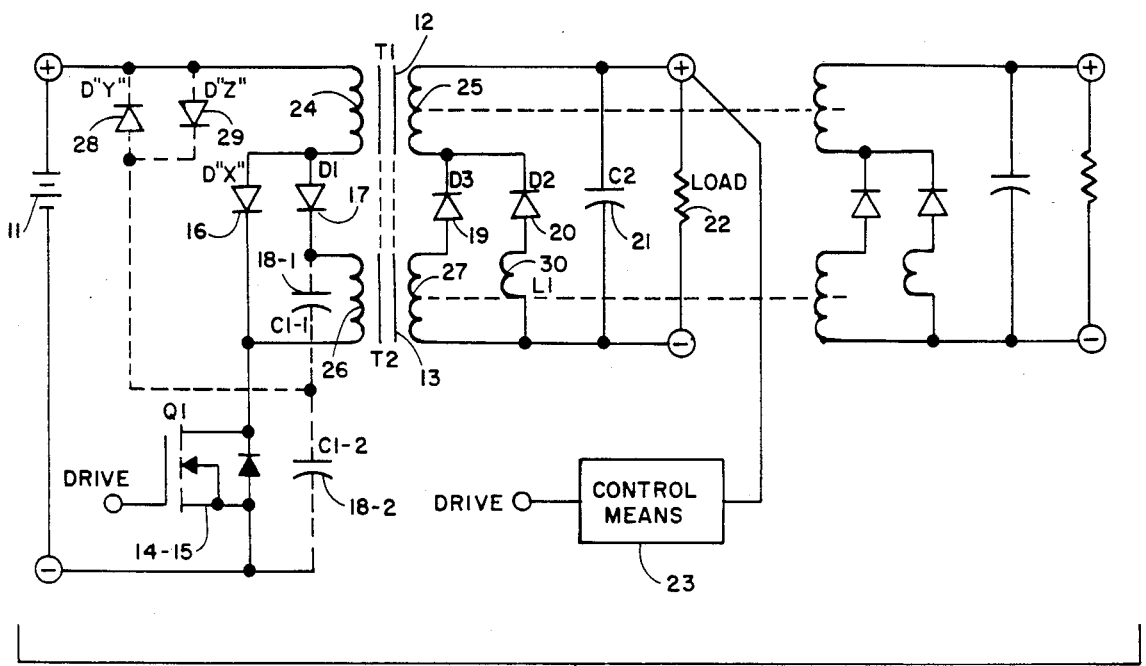
FIG. 8 illustrates the definitive preferred source volt-ampere/load volt-ampere differential converter in single quadrant DC-DC circuit embodiment (isolated).

5. Referring now to FIG. 8, asymptotic elimination of the right half plane zero from the boost transfer function is accomplished by serial division of capacitor 18 and connection of this division junction to DC voltage source 11 positive. Preservation of the continuous input current boost characteristic may be accomplished by anti-parallel unidirectional conducting devices 28 and 29. Any DC source voltage 11 perturbation relative to the boost voltage product (as divided) will forward bias one or the other of unidirectional conducting devices 28 and 29, thus asymptotically circumventing the characteristic boost transfer function. This intrusion is effective for the boost component x=a/(1−δ) of the boost-buck differential function.

6. Compensation for the less than ideal, i.e., zero, ESR of capacitor 18 is accomplished by introduction of inductor 30 into the load current off-state circuit. Inductor 30 has the additional effect of enhancing reverse recovery of unidirectional conducting device 20.

7. Since the prior art output current integration function of an output inductor is herein accomplished by intrinsic circuit equilibrium, the inductance of secondary 25 may be reduced by an order of magnitude from that prior art inductance ordinarily required for continuous current at minimum-rated load. The advantages of this reduction as regards size, efficiency, response characteristics, and output capacitor 21 requirements are manifold and obvious. In fact, absent parasitics (an unattainable condition), the circuit would require no output capacitor 21.

8. These and other features of the instant converter (such as recited in the SUMMARY OF INVENTION) will be obvious to those skilled in the art. It will be equally obvious that, for any given mode, control means 23 can be implemented in an infinite number of ways. Also equally obvious is that the switch(es) 14 and 15 may be redeployed and augmented to configure all prior art circuit geometries, i.e., push-pull, half-bridge, two-transistor forward, full-bridge, etc.

What is claimed is:

1. A source volt-ampere/load volt-ampere differential converter circuit of single quadrant compound switching DC-DC topology comprising:

a DC voltage source;

a first power transformer including a primary winding and a secondary winding, said first power transformer being configured and polarized in the isolated boost mode (fly-back);

a second power transformer including a primary winding and a secondary winding, said second power transformer being configured and polarized in the isolated buck mode (forward);

a first switching device to selectively couple said voltage source across the primary winding of said first power transformer;

a second switching device to selectively couple the boost voltage product of said first power transformer/said first switching device across the primary winding of said second power transformer;

a first unidirectional conducting device connected in series between said first switching device and the primary winding of said first power transformer and oriented to conduct during conduction by said first switching device;

a second unidirectional conducting device connected in series between the junction of said first unidirectional conducting device/primary winding of said first power transformer and a first capacitor, and oriented to conduct during non-conduction by said first switching device;

said first capacitor connected between the series combination of said second unidirectional conducting device/primary winding of said first power transformer and said DC voltage source negative, and oriented to integrate the boost voltage product of said first switching device and said first power transformer;

a third unidirectional conducting device connected in series with the secondary windings of said first and second power transformers, and oriented to conduct during conduction by said second switching device;

a fourth unidirectional conducting device connected in parallel with the series combination of said third unidirectional conducting device/secondary winding of said second power transformer, and oriented to conduct during nonconduction by said first switching device;

a second capacitor connected in parallel with the series combination of said third unidirectional conducting device/secondary windings of said first and second power transformers, and oriented to integrate the compound boost-buck voltage product of said first and second power transformers/said first and second switching devices/said first, second, third, and fourth unidirectional conducting devices/said first capacitor;

a utilization load connected across said second capacitor;

a control means for selectively and simultaneously opening and closing said first and second switching devices for compound energy transfer from said DC voltage source to said utilization load, and responsive to the differential transfer function $\delta = t\,on/(t\,on + t\,off)/\{1 - [t\,on/(t\,on + t\,off)]\}$.

2. The converter circuit of claim 1 wherein said first and second switching devices are combined into a single switching device.

3. The converter circuit of claim 1 wherein said first and second power transformers are combined into a single integrated core structure.

4. The converter circuit of claim 2 wherein said first and second power transformers are combined into a single integrated core structure.

5. The converter circuit of claim 1 wherein the proliferation of secondary windings of said first and second power transformers, said third and fourth unidirectional conducting devices, and said second capacitor, (all according to the term n+1) provides for proliferation of said utilization load (according to the term n+1).

6. The converter circuit of claim 2 wherein the proliferation of secondary windings of said first and second power transformers, said third and fourth unidirectional conducting devices, and said second capacitor, (all according to the term n+1) provides for proliferation of said utilization load (according to the term n+1).

7. The converter circuit of claim 3 wherein the proliferation of secondary windings of said integrated core structure, said third and fourth unidirectional conducting devices, and said second capacitor, (all according to the term n+1) provides for proliferation of said utilization load (according to the term n+1).

8. The converter circuit of claim 4 wherein the proliferation of secondary windings of said integrated core structure, said third and fourth unidirectional conducting devices, and said second capacitor, (all according to the term n+1) provides for proliferation of said utilization load (according to the term n+1).

9. The converter circuit of claim 1 wherein anti-parallel fifth and sixth unidirectional conducting devices are connected between the junction of serially divided said first capacitor/said boost voltage product and said DC voltage source positive, and oriented to asymptotically conduct during positive or negative voltage excursions between said DC voltage source and said boost voltage product as serially divided by said first capacitor.

10. The converter circuit of claim 2 wherein anti-parallel fifth and sixth unidirectional conducting devices are connected between the junction of serially divided said first capacitor/said boost voltage product and said DC voltage source positive, and oriented to asymptotically conduct during positive or negative voltage excursions between said DC voltage source and said boost voltage product as serially divided by said first capacitor.

11. The converter circuit of claim 3 wherein anti-parallel fifth and sixth unidirectional conducting devices are connected between the junction of serially divided said first capacitor/said boost voltage product and said DC voltage source positive, and oriented to asymptotically conduct during positive or negative voltage excursions between said DC voltage source and said boost voltage product as serially divided by said first capacitor.

12. The converter circuit of claim 4 wherein anti-parallel fifth and sixth unidirectional conducting devices are connected between the junction of serially divided said first capacitor/said boost voltage product and said DC voltage source positive, and oriented to asymptotically conduct during positive or negative voltage excursions between said DC voltage source and said boost voltage product as serially divided by said first capacitor.

13. The converter circuit of claim 5 wherein anti-parallel fifth and sixth unidirectional conducting devices are connected between the junction of serially divided said first capacitor/said boost voltage product and said DC voltage source positive, and oriented to asymptotically conduct during positive or negative voltage excursions between said DC voltage source and said boost voltage product as serially divided by said first capacitor.

14. The converter circuit of claim 6 wherein anti-parallel fifth and sixth unidirectional conducting devices are connected between the junction of serially divided said first capacitor/said boost voltage product and said DC voltage source positive, and oriented to asymptotically conduct during positive or negative voltage excursions between said DC voltage source and said boost voltage product as serially divided by said first capacitor.

15. The converter circuit of claim 7 wherein anti-parallel fifth and sixth unidirectional conducting devices are connected between the junction of serially divided said first capacitor/said boost voltage product and said DC voltage source positive, and oriented to asymptotically conduct during positive or negative voltage excursions between said DC voltage source and said boost voltage product as serially divided by said first capacitor.

16. The converter circuit of claim 8 wherein anti-parallel fifth and sixth unidirectional conducting devices are connected between the junction of serially divided said first capacitor/said boost voltage product and said DC voltage source positive, and oriented to asymptotically conduct during positive or negative voltage excursions between said DC voltage source and said boost voltage product as serially divided by said first capacitor.

17. The converter circuit of claim 1 wherein a first inductor is connected in series with said fourth unidirectional conducting device, and oriented to integrate the isolated boost mode current component of the compound boost-buck current product of said first and second power transformers/said first and second switching devices/said first, second, third, and fourth unidirectional conducting devices/said first and second capacitors.

18. The converter circuit of claim 2 wherein a first inductor is connected in series with said fourth unidirectional conducting device, and oriented to integrate the isolated boost mode current component of the compound boost-buck current product of said first and second power transformers/said combined single switching device/said first, second, third, and fourth unidirectional conducting devices/said first and second capacitors.

19. The converter circuit of claim 3 wherein a first inductor is connected in series with said fourth unidirectional conducting device, and oriented to integrate the isolated boost mode current component of the compound boost-buck current product of said integrated core structure/said first and second switching devices/said first, second, third, and fourth unidirectional conducting devices/said first and second capacitors.

20. The converter circuit of claim 4 wherein a first inductor is connected in series with said fourth unidirectional conducting device, and oriented to integrate the isolated boost mode current component of the compound boost-buck current product of said integrated core structure/said combined single switching device/said first, second, third, and fourth unidirectional conducting devices/said first and second capacitors.

21. The converter circuit of claim 5 wherein a first inductor is connected in series with said fourth unidirectional conducting device, and oriented to integrate the isolated boost mode current component of the compound boost-buck current product of said first and second power transformers/said first and second switching devices/said first, second, third, and fourth unidirectional conducting devices/said first and second capacitors.

22. The converter circuit of claim 6 wherein a first inductor is connected in series with said fourth unidirectional conducting device, and oriented to integrate the isolated boost mode current component of the compound boost-buck current product of said first and second power transformers/said combined single switching device/said first, second, third, and fourth unidirectional conducting devices/said first and second capacitors.

23. The converter circuit of claim 7 wherein a first inductor is connected in series with said fourth unidirectional conducting device, and oriented to integrate the isolated boost mode current component of the compound boost-buck current product of said integrated core structure/said first and second switching devices/said first, second, third, and fourth unidirectional conducting devices/said first and second capacitors.

24. The converter circuit of claim 8 wherein a first inductor is connected in series with said fourth unidirectional conducting device, and oriented to integrate the isolated boost mode current component of the compound boost-buck current product of said integrated core structure/said combined single switching device/said first, second, third, and fourth unidirectional conducting devices/said first and second capacitors.

25. The converter circuit of claim 9 wherein a first inductor is connected in series with said fourth unidirectional conducting device, and oriented to integrate the isolated boost mode current component of the compound boost-buck current product of said first and second power transformers/said first and second switching devices/said first, second, third, fourth, fifth, and sixth unidirectional conducting devices/said first and second capacitors.

26. The converter circuit of claim 10 wherein a first inductor is connected in series with said fourth unidirectional conducting device, and oriented to integrate the isolated boost mode current component of the compound boost-buck current product of said first and second power transformers/said combined single switching device/said first, second, third, fourth, fifth, and sixth unidirectional conducting devices/said first and second capacitors.

27. The converter circuit of claim 11 wherein a first inductor is connected in series with said fourth unidirectional conducting device, and oriented to integrate the isolated boost mode current component of the compound boost-buck current product of said integrated core structure/said first and second switching devices/said first, second, third, fourth, fifth, and sixth unidirectional conducting devices/said first and second capacitors.

28. The converter circuit of claim 12 wherein a first inductor is connected in series with said fourth unidirectional conducting device, and oriented to integrate the isolated boost mode current component of the compound boost-buck current product of said integrated core structure/said combined single switching device/said first, second, third, fourth, fifth, and sixth unidirectional conducting devices/said first and second capacitors.

29. The converter circuit of claim 13 wherein a first inductor is connected in series with said fourth unidirectional conducting device, and oriented to integrate the isolated boost mode current component of the compound boost-buck current product of said first and second power transformers/said first and second switching devices/said first, second, third, fourth, fifth, and sixth unidirectional conducting devices/said first and second capacitors.

30. The converter circuit of claim 14 wherein a first inductor is connected in series with said fourth unidirectional conducting device, and oriented to integrate the isolated boost mode current component of the compound boost-buck current product of said first and second power transformers/said combined single switching device/said first, second, third, fourth, fifth, and sixth unidirectional conducting devices/said first and second capacitors.

31. The converter circuit of claim 15 wherein a first inductor is connected in series with said fourth unidirectional conducting device, and oriented to integrate the isolated boost mode current component of the compound boost-buck current product of said integrated core structure/said first and second switching devices/said first, second, third, fourth, fifth, and sixth unidirectional conducting devices/said first and second capacitors.

32. The converter circuit of claim 16 wherein a first inductor is connected in series with said fourth unidirectional conducting device, and oriented to integrate the isolated boost mode current component of the compound boost-buck current product of said integrated core structure/said combined single switching device/said first, second, third, fourth, fifth, and sixth unidirectional conducting devices/said first and second capacitors.

* * * * *